United States Patent Office 3,459,841
Patented Aug. 5, 1969

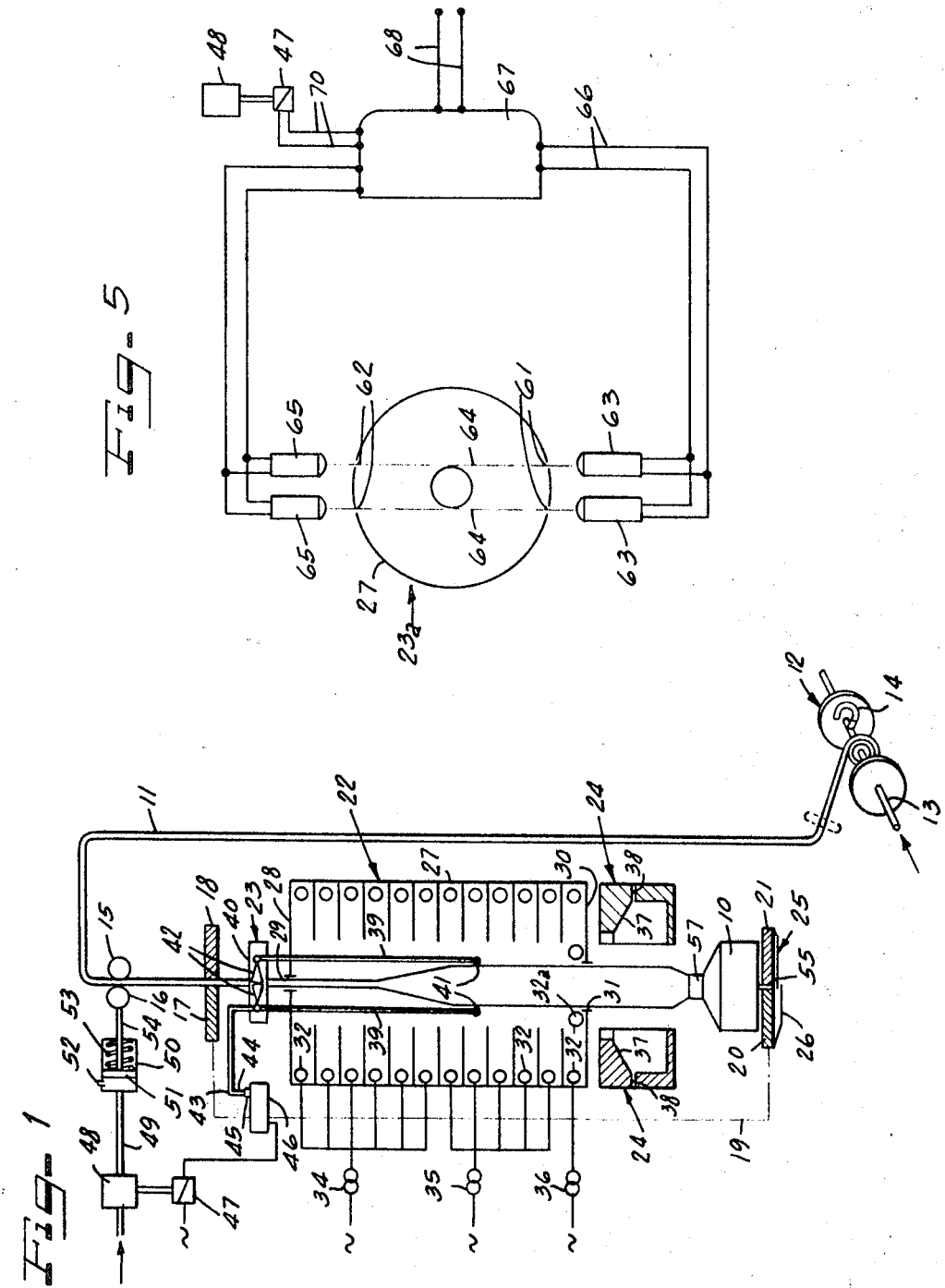

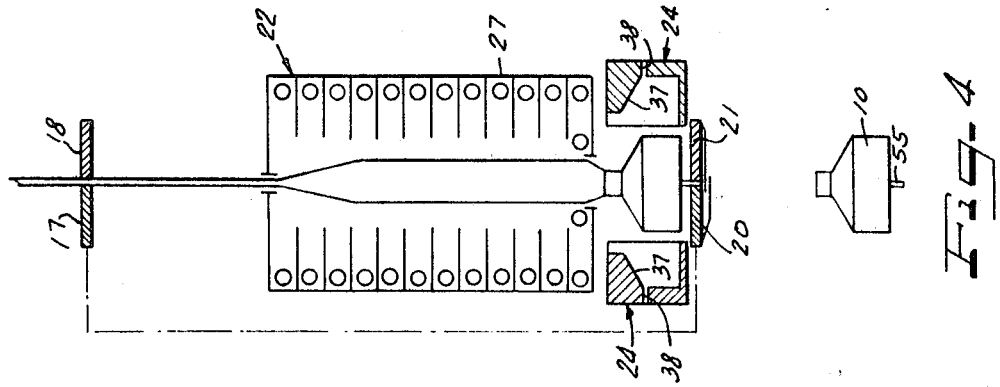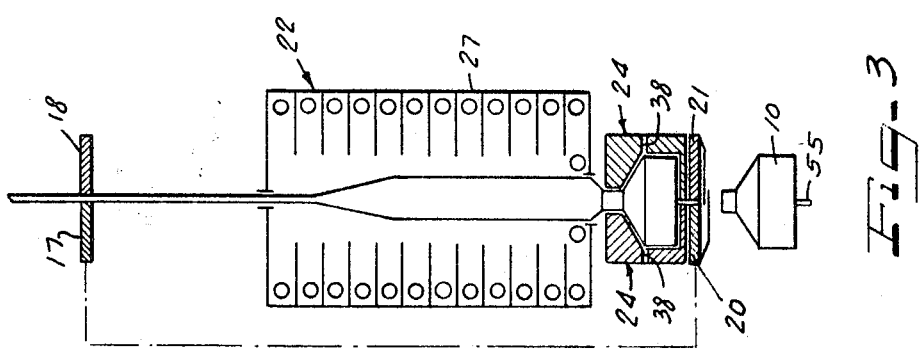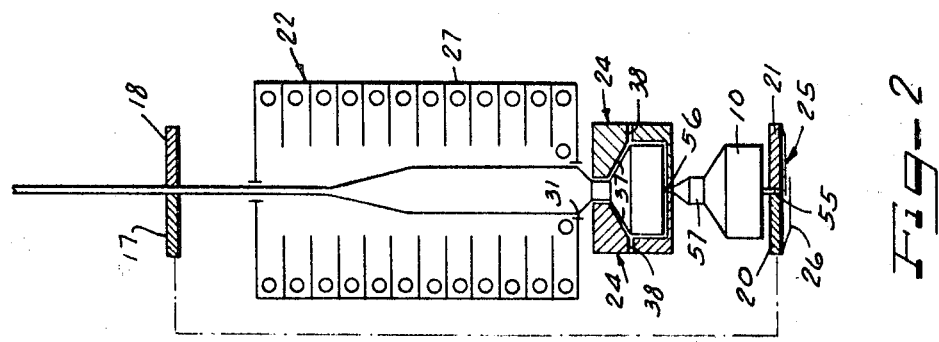
INVENTOR.
BERNHARD SEILER

3,459,841
CONTAINER FORMING METHOD
AND APPARATUS
Bernhard Seiler, Zurich, Switzerland, assignor of one-half
to Emil Hartmann, Zurich, Switzerland
Filed Dec. 20, 1966, Ser. No. 603,337
Claims priority, application Switzerland, Dec. 22, 1965,
17,722/65
Int. Cl. B29c 17/07
U.S. Cl. 264—40                                              18 Claims

ABSTRACT OF THE DISCLOSURE

The disclosure relates to a method and means for forming containers on like hollow objects from flattened tubular stock wherein a flattened plastic tube is for instance uncoiled from a reel by a feeding apparatus and wherein the portion of the tubular stock only which is being worked is heated in a heating apparatus until a plastic condition of the stock is attained, the tube is flared into a desired form in a mold and the finished part thus molded is then cut off from the tubular stock.

DESCRIPTION OF THE PRIOR ART

Apparatus designed for this purpose and disclosed in the prior art generally employs a relatively stiff tube of circular cross section which has the considerable disadvantage in that only a relatively short length of tubing can be coiled on a storage reel because the circular cross section of the tube takes up considerable space. Thus, during operations, the reel must be replaced frequently, and this is time consuming. Still more important, it is impossible to start out with printed tubes. Still further, the prior art discloses arrangements wherein compressed air is introduced by means of a hollow pin into the plastically deformable section of the tube located in the mold for the purpose of blowing the tube out into conformity with the mold parts. Such blower assemblies are relatively expensive and do not operate very rapidly.

Some flattened plastic tube arrangements known in the prior art are only designed to produce an end product wherein a series of hollow body sections are formed in the tube and remain connected together or can at least have flattened end sections at either end thereof.

SUMMARY OF THE INVENTION

Generally speaking, the method according to the invention is characterized by the fact that a flattened plastic tube is coiled on a reel and compressed air is introduced into its reel-side end. The tube is fed automatically into a heating apparatus to plasticize the flattened tube and the compressed air working through the tube within the plasticized portion inside the heating apparatus is effective to widen or flare the tube and means are provided for regulating the pressure of air in that part of the tube contained within the heating apparatus. The tube is advanced step by step through the heating unit and as it emerges from the heating unit, mold dies are closed around one section of the flared, plastically deformable tube portion and these mold parts are connected to a vacuum source so that the deformable tube section adheres to the inner surface of the mold parts and the deformable section is thus vacuum formed. After an additional advancement of the tube through the assembly, the container so formed is separated from the following one still located in the mold dies and the entire process is then repeated.

It is, therefore, a principal object of the present invention to provide a method for forming plastic containers which embodies in general terms each of the steps set forth above.

It is a further and more specific embodiment of the invention to provide a means for working the plastic tube according to the method and wherein scanning means are provided to scan the tube part located inside the heating apparatus and being widened and an apparatus for throttling the pressure prevailing in said tube part.

In addition, the invention contemplates the provision of a means for forming plastic containers wherein vacuum forming mold members are employed at a point adjacent the area from which the plasticized tube emerges from the heating unit and an arrangement wherein the means for sealing off the plasticized tube, cutting off the just-formed plastic container, and pulling the tube through the heating unit and off the reel the desired distance is a single unit.

These and other objects features and advantages of the present invention will become apparent to those skilled in this art from the following detailed description and the annexed sheets of drawings which show two embodiments of the invention.

BRIEF DESCRIPTION OF THE DRAWINGS

FIGURE 1 shows schematically the essential and novel components of an apparatus for the manufacture of plastic containers and in which the several parts are shown in positions they occupy in an initial phase of an operating cycle;

FIGURES 2, 3 and 4 show only a few of the parts illustrated in FIGURE 1 but illustrate the same assembly in second, third and fourth stages of the operating cycle, respectively; and FIGURE 5 illustrates schematically a second embodiment of a means for scanning the plasticized portion of the tube within the heating unit for determining the pressure of air to which the interior of the plasticized portion of the tube is to be subjected.

DESCRIPTION OF THE PREFERRED EMBODIMENTS

The apparatus shown in the drawings is used for the purpose of making small containers such for example as the container 10 illustrated in FIGURE 4 from a flattened plastic tube such as is shown at 11 in the drawings. It will be observed that the tube 11 has a hollow interior but a generally flat cross section so that it can be printed with suitable advertising and/or promotional material without any problem before being wound on a reel 12, in order to be successively unwound therefrom in the course of the operation of the apparatus. The shaft 13 of the reel 12 is hollow and is adapted to be connected to a source of pressurized air at its outermost end and this same shaft is provided with a radially oriented discharge stud 14 upon which one end of the tube 11 is fitted. The shaft 13 is likewise connected via a stuffing box (not shown) to a compressed air conduit by means of which compressed air can be fed to the hollow interior of the tube 11 at a pressure of 0.5 atmosphere excess pressure, for instance.

Various guide rollers can be employed to direct the tube 11 from the reel 12 to and through a pair of squeeze rollers 15, 16 the purpose of which will be explained hereafter. Below the pair of squeeze rollers 15, 16 there is a first pair of feed jaws 17, 18 movably mounted at the upper end of a frame 19. A second pair of feed jaws 20, 21 are similarly provided at the lower end of the frame 19. Each set of jaws 17, 18 and 20, 21 are movable in a horizontal direction as indicated by the arrows adjacent those jaws and such movement can be effected through a pneumatic actuator as will be understood by those skilled in this art. The frame 19 is itself movable in a vertical direction as indicated by suitable arrows and such vertical movement of the entire frame, including the jaws 17, 18 and 20, 21 is effected pneumatically in a like manner.

Broadly speaking, the apparatus is designed so that the tube 11 is intermittently pulled downwardly through a heating apparatus 22 where the tube is softened by the heat to a plastic state. Air passing through the tube 11 from the reel end of the tube is effective to blow or flare out the plasticized portion of the tube within the heating apparatus 22 and a scanning unit 23 is effective to regulate the blown-up or flared-out dimension of the tube at the lower end of the heating apparatus. Vacuum-forming mold dies 24 are movable toward and apart from one another at a point adjacent the place where the tube emerges from the heating apparatus 22 and cutting blades 25, 26 connected to the lower feed jaws 20, 21 are effective to cut off the molded part from the remainder of the tube after the molding operation.

The heating apparatus 22 comprises a cylindrical housing 27, the lid 28 of which is provided with an entrance slot 29 corresponding approximately to the flattened cross-sectional dimension of the tube 11 entering the heating apparatus, while the base wall 30 of the housing has a central circular discharge orifice 31 provided. In the housing 27 a plurality of electrical heating coils 32 are arranged superposed in the proximity of housing jacket and separated from each other by circular disks 33. The uppermost six heating coils 32 are fed in parallel circuit via a control transformer 34 from the AC power line, whereby for simplicity's sake, the circuit is shown in unipolar design. A second control transformer 35 is used to control the voltage fed to the subsequent five heating coils 32, and a third control transformer 36 is used to control the voltage of the bottom-most heating coil 32 and a coil immediately adjacent the discharge orifice 31 which coil is identified with the numeral 32a.

The heating apparatus is designed so that the temperature of the heating coils adjacent the lower end of the heating apparatus is considerably higher than that at the entrance opening to the apparatus at the top thereof, so that the temperature increases from the top downward. As a consequence, the tube material within the heating apparatus becomes soft so that under the influence of the temperature prevailing within the apparatus and as a result of the slight superatmospheric pressure coming from the reel end of the tube, the tube widens out and takes on a circular cross section. The disks 23 may preferably be made from stainless steel and are used to transfer the heat generated by the heating coils 32 by heat transfer and then by radiation to the tube 1, avoiding as far as possible a poorly controllable heat transfer by convection. The entire heating apparatus is, of course, provided with suitable insulation.

The mold dies 24 which are disposed immediately adjacent the discharge opening at the lower end of the heating apparatus 22, are movable in a horizontal direction toward and away from one another by pneumatic or any other suitable means. The inner surface 37 of the mold dies 24 has the shape of the container or object to be manufactured. Each mold die 24 has a channel 28 formed therein which channel is connected to a vacuum pump (not shown).

As already noted, in order to separate a finished container from a like container formed subsequently thereto, the lower feed jaws 20, 21 are provided on their undersurfaces with cutting knives 25, 26.

The scanning device 23 is employed for the purpose of maintaining desired blown-up tube dimension within the heating apparatus 22 and does this by sensing the blown-up dimension of the tube within the heating apparatus and controlling as a function of the thus sensed tube dimension, the operation of the squeeze rollers 15, 16 so that the pressure in that section of the tube contained within the heating apparatus 22 has the correct value so that it only slightly exceeds the external atmospheric pressure prevailing in the housing. For that purpose, the scanning device 23 is provided with two pivotally arranged scanning levers 39 which are pivoted on a stationary support 40 which is stationary with relation to the frame. The free ends of the scanning levers 39 are provided with scanning portions 41 which are disposed at opposite sides of the widened tube section 11. Each one of the two scanning levers 39 is provided adjacent its pivotal axis with a sector gear 42. The two sector gears engage one another so that both secanning levers are designed to pivot simultaneously and to the same extent in opposite directions. An operating arm 43 is fixedly connected to the left-handmost lever 39 and has a finger 44 which coacts with the operating button 45 of a micro switch 46. The micro switch 46 is connected in series with a control apparatus 47 of an electromagnetically actuable valve assembly 48 to the AC power line in the circuit likewise shown only in unipolar design. The micro switch 46 is biased normally open. The electromagnetic control valve is simply an air valve which is connected on the one hand to a compressed air conduit (not shown) and on the other hand via a very thin conduit 49 with a cylinder 50. A piston 51 is movably mounted within the cylinder 50 and has a small bleed port 52 formed at the left-handmost end thereof. The piston is spring biased by a spring 53 toward the left-hand end of that cylinder. Squeeze roller 16 is affixed to the outermost end of the piston rod 54 extending exteriorly of the cylinder 50 so that when compressed air is directed from the compressed air source through the valve 48, line 49, and into the cylinder 50, the piston 51 is moved toward the right against the opposing bias of the spring 53 and the squeeze roller 16 acts against the stationarily mounted roller 15 to squeeze the tube 11 and reduce the air flow through the tube 11 to the plasticized end portion of the tube.

When the pressure in the hose section disposed within the heating apparatus 22 is too high, both scanning levers 39 are pivoted in opposite directions outwardly, and the operating arm 43 acts through the finger 44 to relieve the operating button, thereby closing the micro switch 46 and energizing the control coil 47 of the electromagnetically operable valve 48. Energization of the coil 47 is effective to open the valve 48 so that compressed air flows through the very thin conduit 49 at low speed into the cylinder 50, whereby the squeeze roller 16 is slowly pressed against the stationary squeeze roller 15. Consequently, the supply of air to the widening tube section within the heating apparatus is throttled, so that the pressure therein cannot become too high since this would eventually lead to bursting and prevent movement of the tube through the heating apparatus. As the pressure in the tube section within the heating apparatus declines, the operating button of the switch 46 is pressed downwardly by movement of the scanning levers 39 inwardly and the micro switch is thereby opened. The control coil is thus deenergized and the valve 48 closes so that compressed air is now permitted to escape through the vent port 52 at low speed from the cylinder 50, so that the spring 53 displaces the piston 51 to the left, thus moving the squeeze rollers 15, 16 apart so that more air can again enter the hose.

FIGURE 1 represents the first phase position of an operating cycle, whereby one container 10 which has just been formed in the preceeding operating cycle still hangs at the lower end of the tube. The mold dies 24 have been moved apart from one another and the feed jaws 17, 18 and 20, 21 are closed. The feed jaws 20, 21 contain a flap 55 formed integrally with the container 10 and extending downwardly therefrom. The frame 12 has moved to its lower terminal position and a new cycle is ready to begin.

Only the parts necessary for the immediate description have been carried over from FIGURE 1 to FIGURE 2. In FIGURE 2, the mold dies 24 have been moved to a closed position and air has been aspirated through the channels 38 from the inside of the mold so as to cause the plasticized section of the tube into engagement with the inner surfaces 37 of the mold parts. The container 10 just previously so formed, however, is not cut off by the impacting bottom parts of the mold parts 24. The tube is merely squeezed together to form a low depending lip 56, said section being above the neck 57 of the depending and just previously formed container 10.

In order to arrive at the position of the various parts shown in FIGURE 3, the feed jaws 17, 18 and 20, 21 are opened one after the other and the frame 19 is displaced upwardly, whereupon the feed jaws are closed again as shown in FIGURE 3. Upon closing, the lower feed jaws 20, 21 squeeze the tube portion just immediately above the neck 57 of the just formed container into the flap 55 first described in FIGURE 1 which flap really amounts to an extension of the low flap 56 formed in FIGURE 2 while at the same time knives 25, 26 cut the tube below the flap 55. The lowermost depending container 10 is thereby separated from the tube itself and drops as shown in FIGURES 3 and 4. Obviously, it may be that the cut caused by the knives 25, 26 may not bring about a complete separation of the containers but in such event the cut so debilitates the tube at the location involved that the container 10 can be removed from the other previously formed containers without any trouble.

In order to arrive at the position shown in FIGURE 4, the mold dies 24 are cooled and then the mold dies are opened. Cooling channels may be provided in the mold dies for this purpose in a manner well understood by those skilled in this art.

In the next step, the frame 19 is lowered whereby the feed jaws 17, 18 and 20, 21 pull the tube downwardly within the heating apparatus 22 and a like section thereof is correspondingly unwound from the reel 12. During the phases of the operation illustrated in FIGURES 2, 3 and 4, the heating of the tube 11 in the heating apparatus 22 increases so that the widened tube part moves upwardly within the heating apparatus as may be observed from the several figures of the drawings.

The scanning means 23 is very important for satisfactory automatic operation in connection with the control device as a whole. Actually, the squeeze rollers 15, 16 or any other throttling apparatus for the compressed air fed to the widened tube part could also be operated manually and in such case an exact observation of the shape of the containers produced could be used as a criterion. However, such a procedure would be costly and not too reliable or practical in operation. The method cannot be satisfactorily executed without any control of the air pressure, because the length of the tube 11 between the reel 12 and the heating apparatus 22 retracts during the course of the processing of the tube so that the drop of pressure therein becomes smaller, and thus in the widened tube portion within the bleeding apparatus, the pressure would steadily increase as a result of the absence of a control.

It is obvious that the squeeze rollers 15, 16 or any other throttling device for the compressed air need not be arranged immediately adjacent the upper feed jaws 17, 18 but could operate upon the tube even in the proximity of the reel 12 or even control the supply of compressed air ahead of the reel 12. However, it is preferable to provide the throttling spot as close as is reasonably possible to the heating apparatus itself. Obviously, control means of a different kind, as well as variance of the control means shown could be provided between the scanning means 23 and the squeeze rollers 15 and 16. To be specific, a lever transmission might advantageously be employed between the piston rod 54 and the squeeze roller 16 so that a small movement of the squeeze roller 16 would be effected by a relatively long piston stroke. Moreover, it is evident that with a different arrangement of the operating arm 33 and a different layout of the micro switch 46, the latter could be closed by applying pressure to the push button instead of relieving the switch.

The method above described and the means for practicing it offers the great advantage that a flat, preferably printed tube could be used as a basic material, of which something on the order of three thousand feet or more of tubing could be accommodated on a single reel to deliver finished containers in rapid sequence which later could be filed automatically, for instance on an automatic filling machine.

In the embodiment of the invention illustrated in FIGURE 5 a photoelectric scanning apparatus 23a shown which could be used in lieu of the mechanical scanning apparatus 23. Only the housing 27 of the heating apparatus 22 is indicated and it is shown as being provided with two pairs of openings 61 and 62 which are directly oppsite one another. Outside the housing 27 two luminous sources 63 are arranged opposite the holes 61 and each is provided with an optical system not shown in detail so that they dispatch two sharply clustered luminous rays 64 through the holes 61 and 62. The luminous rays 64 extend on both sides of the widened hose part tangentially to it and in fact on two photoelectric cells 65 located outside the housing 27 and opposite the hole 62. The distance of the two rays 64 extending parallel to each other is equal to outer hose part desired. It is expedient to have the distance between the two luminous sources 63 of the two photoelectric cells adjustable in accordance with the various desired rated diameters.

Both luminous sources 63 are connected parallel to each via conduits 66 to an equipment box 67 which contains various electrical appliances not particularly shown (for instance, a rectifier, amplifier, a relay, adjustment resistances, etc.) which are fed via conduits 68 from the customary 110 volt AC power system. Both photoelectric cells 65 are connected to one another via conduits 69 to the appliance box 67 and/or the amplifier contained in it which in turn controls the relay in the contact circuit 70 of which the control coil 47 of the electromechanically actuated valve 48 is placed.

When the diameter of the tube section becomes too large, the rays 64 are thereby prevented from reaching the photoelectric cells 65, primarily by deflection at the surface of this tube section. When both photoelectric cells 65 are no longer energized, the relay is so switched via the amplifier that its contact circuit 70 is closed, so that a current flows in the control coil 47 of the valve 48. Consequently, the valve 48 is opened, as has already been described to effect a throttling of the air supply through the tube 11. The photoelectric scanning apparatus offers one considerable advantage over the mechanical counterpart in that it still works satisfactorily when the material of the tube portion adjacent the squeeze rollers has become very soft due to heating.

These embodiments of this invention have been used for illustrative purposes only and it must be understood that various modifications and variations in the invention can be effected without departing from the spirit and scope of the novel concepts thereof.

I claim as my invention:
1. A method of forming containers from flattened tubular stock which comprises:
    feeding the said flattened tubular stock into one end of a heating apparatus,
    introducing pressurized air into the hollow interior of said flattened stock at an end thereof remote from said heating apparatus,
    regulating the temperature of said heating apparatus and the pressure of the air supplied to said stock so that the temperature plasticizes the portion of said stock within said heating apparatus and said pressurized air flares out said plasticized tube portion to a desired dimension,
    vacuum-forming the flared and plasticized portion of said stock into a desired container configuration, and sequentially separating a formed container from said stock and closing the adjacent end of said plasticized stock.

2. A method of forming containers from flattened tubular stock in accordance with claim 1 wherein the feeding is effected intermittently and wherein the pressure of air supplied to the interior of said flattened tubular stock is governed in direct relation to the expanded size of the flared and plasticized end of said tube.

3. A container-forming assembly which comprises:
a heating apparatus,
means feeding flattened tubular stock into said heating apparatus whereby said stock is heated to a plastic state,
means communicating the interior of said stock with a source of pressurized air whereby the pressurized air within the heated plastic portion of said tubular stock will expand and flare the said heated plastic portion,
means sensing the expanded sizes of the heated plastic portion of said tube,
means regulating the pressure of air supplied to the interior of said tube as an inverse function of the sensed expanded size whereby to maintain the expanded size within predetermined dimensional limits,
vacuum form molding means operable upon the heated and plastic tube section for molding said tube section into a desired container configuration, and
means separating a formed container from the attached end of said tube.

4. A container-forming assembly constructed in accordance with claim 3 wherein said flattened tubular stock is stored on a reel and wherein pressurized air is supplied to the interior of said flattened tubular stock through the free end of said stock mounted on said reel.

5. A container-forming assembly constructed in accordance with claim 3 wherein said heating apparatus has entrance and egrees openings, said flattened tubular stock is fed in steps through said apparatus, and said vacuum form molding means are positioned outside of said heating apparatus and adjacent the egress opening therefrom.

6. A container-forming assembly constructed in accordance with claim 3 wherein the pressure of air directed to the heated plastic portion of said tube is regulated by squeezing together a portion of the tube intermediate the heated section and the air source.

7. A container-forming assembly constructed in accordance with claim 4 wherein feeding of the flattened tubular stock through said heating apparatus is effected by a feeding device comprising a frame movable up and down at whose upper and lower ends pairs of feed jaws movable toward and away from one another are provided, wherein the upper feed jaws grip the tube prior to its entry into the entrance opening of the heating apparatus and wherein the feed jaws located at the lower end of said frame grip the tube below the vacuum form molding means and wherein said feed jaws grip the tube and said frame moves in a direction to pull said tube through said heating apparatus when said vacuum form molding means are inactive and out of contact with the stock.

8. A container-forming assembly constructed in accordance with claim 7 wherein the feed jaws at the lower end of said frame have cutting knives mounted on the under surfaces thereof whereby to separate a finished container from the stock located immediately thereabove.

9. A container-forming assembly which comprises:
a heating apparatus having entrance and egress openings formed at opposite ends thereof,
means feeding tubular stock into and through said heating apparatus,
said means comprising a frame having feed jaws located at opposite ends thereof,
one set of feed jaws being located adjacent said entrance opening of said heating apparatus and one in proximity to said egress opening,
control means closing each set of said feed jaws about said tube at both points and thereafter moving said frame in a direction to pull said tube through said heating apparatus a desired distance,
means supplying air under pressure to said tube to cause the heated plastic portion of said tube to expand,
scanning means sensing the expanded size of the heated plastic portion of said tube,
means regulating the pressure of air supplied to the heated plastic portion of said tube as a function of the expanded tube size sensed by said scanning means,
vacuum forming mold dies movable into and out of engagement with one another and located immediately adjacent said egress opening of said heating apparatus and between said heating apparatus and said lower set of feed jaws,
means moving said mold dies apart prior to tube-feeding movement of said frame, and
cutting blades carried on the undersurface of said lower set of feed jaws whereby to separate a container from the stock.

10. A container forming assembly constructed in accordance with claim 9 wherein said scanning means comprises a pair of scanning levers scanning the widened part of said tube within said heating apparatus on opposite sides of the tube, said levers being so coupled with one another that they execute pivoting movements of equal extent in opposite directions, and means regulating the pressure of air supplied to the heated plastic part of said tube as a function of the pivoted position of these said levers.

11. A container-forming assembly constructed in accordance with claim 9 wherein electric eye sensors are employed to sense the expanded state of said tube on two opposed sides of the said tube within said heating apparatus and whereby the pressure of air supplied to the heated plastic part of said tube is regulated as a function of the width of the tube sensed by such electric eye.

12. A container-forming assembly constructed in accordance with claim 9 wherein the pressure of air supplied to the heated plastic portion of said tube is controlled by a pair of squeeze elements located just in advance of the entrance opening of the heating apparatus whereby to squeeze the tube and thereby throttle the air directed to that portion of the tube from a remote source.

13. A container-forming assembly constructed in accordance with claim 12 wherein the squeezing means comprises a stationary squeeze roller and a movable squeeze roller and whereby the movable squeeze roller is connected to a piston via a motion translation means whereby large piston movements result in small incremental movements of the movable squeeze roller and wherein pneumatic movement of the piston is controlled through said scanning means.

14. A container-forming assembly constructed in accordance with claim 9 wherein said heating apparatus consists of a casing having several superposed groups of heating coils disposed therein along the path of movement of the tube and wherein the heating output of said heating coils is adjustable by means of separate control means.

15. A container-forming assembly constructed in accordance with claim 9 wherein the heating apparatus comprises generally a cylindrical casing and wherein the entrance opening has a slot-like ingress aperture and wherein the egress opening has a slot complementary in configuration to the desired expanded configuration of the flared-out tube.

16. A container-forming assembly constructed in accordance with claim 14 wherein the heating coils are located in the proximity of the jacket of the cylindrical housing and individual disks are provided to separate the several heating coils and said disks are formed of a heat transfer material whereby heat is transferred to said tube primarily by radiation and conduction through the metal rather than by convection.

17. A container-forming assembly constructed in accordance with claim 14 wherein the lowermost heating coil is disposed immediately adjacent said egress opening as close as is reasonably possible to said tube to further increase the tube temperature shortly prior to its entry into the mold dies.

18. A container-forming mechanism which comprises:
means for feeding a flattened tubular stock of thermoplastic material into one end of a heating apparatus,
means introducing pressurized air into the hollow interior of said flattened stock at an end thereof, remote from said heating apparatus,
means regulating the temperature of said heating apparatus and the pressure of the air supplied to said stock so that the temperature plasticizes the portion of said stock within said heating apparatus and said pressurized air flares out said plasticized tube portion to a desired dimension,
means vacuum-forming the flared and plasticized portion of said stock into a desired container configuration, and
means sequentially separating a formed container from said stock and closing the adjacent end of said plasticized stock.

References Cited

UNITED STATES PATENTS

| | | | |
|---|---|---|---|
| 3,114,172 | 12/1963 | Coste | 18—19 |
| 3,370,112 | 2/1968 | Wray | 264—89 |
| 3,396,219 | 8/1968 | Sutterfield et al. | 264—40 |
| 3,399,424 | 9/1968 | Sheptak | 18—5 |

WILBUR L. McBAY, Primary Examiner

U.S. Cl. X.R.

18—5, 19; 264—89